(12) United States Patent
Baxter et al.

(10) Patent No.: US 6,477,600 B1
(45) Date of Patent: Nov. 5, 2002

(54) APPARATUS AND METHOD FOR PROCESSING ISOCHRONOUS INTERRUPTS

(75) Inventors: Brent S. Baxter, Hillsboro; John I. Garney, Portland, both of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/327,937

(22) Filed: Jun. 8, 1999

(51) Int. Cl.[7] ............................................. G06F 13/14
(52) U.S. Cl. ........................... 710/260; 710/48; 710/267
(58) Field of Search ................................. 710/260, 262, 710/263, 264, 266, 267, 48, 49

(56) References Cited

U.S. PATENT DOCUMENTS

| | | | | |
|---|---|---|---|---|
| 3,789,365 A | * | 1/1974 | Jen et al. ..................... | 710/264 |
| 4,349,873 A | * | 9/1982 | Gunter et al. ................ | 395/725 |
| 5,363,506 A | * | 11/1994 | Fukuoka ....................... | 710/267 |
| 5,555,413 A | * | 9/1996 | Lohman et al. .............. | 710/260 |
| 5,708,814 A | * | 1/1998 | Short et al. .................. | 710/260 |
| 5,708,817 A | * | 1/1998 | Ng et al. ...................... | 710/266 |
| 5,768,599 A | * | 6/1998 | Yokomizo .................... | 710/260 |
| 5,905,913 A | * | 5/1999 | Garrett et al. ................ | 710/49 |
| 5,987,538 A | * | 11/1999 | Tavallaei et al. ............. | 710/48 |
| 6,067,408 A | * | 5/2000 | Runaldue et al. ........... | 395/250 |
| 6,112,274 A | * | 8/2000 | Goe et al. .................... | 710/260 |
| 6,115,779 A | * | 9/2000 | Haubursin et al. .......... | 710/262 |
| 6,266,732 B1 | * | 7/2001 | Chen et al. .................. | 710/263 |

* cited by examiner

*Primary Examiner*—Jeffrey Gaffin
*Assistant Examiner*—Abdelmoniem Elamin
(74) *Attorney, Agent, or Firm*—Kenyon & Kenyon

(57) ABSTRACT

A computer system provides for the use of isochronous interrupts by devices coupled with the system. Isochronous interrupt requests are received by an interrupt controller during a first time period, recorded, and executed during a second time period. The devices are equipped to handle the delay in interrupt execution. The interrupt controller is set to service isochronous interrupts on a periodic basis. The interrupt controller may flexibly schedule the execution of the isochronous interrupt request at any time during the second time period.

31 Claims, 5 Drawing Sheets

APPARATUS AND METHOD FOR PROCESSING ISOCHRONOUS INTERRUPTS

BACKGROUND INFORMATION

For a computer system to provide a wide range of functionality to users, it must be able to incorporate various devices into the system, i.e., allow different devices to send data to the system to be used in system applications. These devices can include such hardware as, for example, a keyboard, a mouse, a compact disk player, a modem, a video display, a scanner, a printer, and a Universal Serial Bus (USB) interface (to name only a few), and may also include software applications, either associated with these hardware devices (e.g., drivers) or as independent applications. The difficulty posed in receiving data from such devices is that each device is relatively autonomous, and thus each device may have data to send to the system at any time, and sometimes at the same time as other devices. Where two devices attempt to send data at the same time, the data from one (or both) of the devices may be lost due to the "contention" for system resources caused by the data "collision."

Various methods have been employed to process the data provided by these devices in order to avoid the loss of data from contention. One such method incorporates data into the computer system by having the system "poll" each device connected to the system at a regular interval to check if any data is ready to be transmitted by the device. This method may be called "synchronous," since each device in effect has its own time slot for transmitting data to the computer system. The problems with this polling method are that it requires significant system overhead to perform the polling (even when many devices do not have data to send), and it cannot account for devices that have a large amount of data to send in a short period of time (i.e., more data than can be handled in the time slot assigned to the device).

Another method for servicing the data transmission needs of devices is the generation and reception of "interrupts." A device would transmit an interrupt signal to the system whenever it had data to transmit to the system, and when the system receives the interrupt, it immediately executes an interrupt handling routine to receive the data from the interrupting device. This method is asynchronous, since the device may generate an interrupt at any time (regardless of the system state), and the system processes the interrupt as soon as it is received. Although this method reduces the processing requirements of the system compared to the polling method, the possibility of missed data exists where a number of devices make interrupt requests at the same time (or at least before the system can complete a previously executed interrupt handling routine). Where many devices are connected to the system, or where the devices connected to the system transmit large quantities of data, interrupt contention can be a serious concern.

An improvement on the basic asynchronous interrupt method described above assigns priorities to various types of interrupts, such that high priority interrupts are processed before low priority interrupts. This scheme may alleviate data loss for devices that are assigned a high priority, but may further accentuate data loss for low priority devices, since it may take even longer to execute the interrupt handling routine for these low priority devices.

The problem of data loss due to interrupt contention is exacerbated by the use of more data intensive devices. For example, using a video camera (e.g., in a video teleconferencing application) generates large amounts of data to represent the video images, which may encounter interference from data generated by compact disk players (CD-ROMs) to play audio and/or video, high-speed modems and network connections.

SUMMARY OF THE INVENTION

A method for processing interrupts is implemented according to the present invention. The method includes receiving a first interrupt during a first time period, delaying the execution of a first interrupt handling routine corresponding to the first interrupt until a second time period, and executing the first interrupt handling routine before the end of the second time period. An interrupt handling system is also implemented according to the present invention. The interrupt handling system includes a number of interrupt inputs, at least one interrupt output, and an interrupt controller coupled to the number of interrupt inputs and the at least one interrupt output. The interrupt controller includes an isochronous interrupt controller to process at least one isochronous interrupt request received via at least one of the number of interrupt inputs during a first time period, and to generate an interrupt signal at the at least one interrupt output during a second time period.

DETAILED DESCRIPTION

Figure 1:
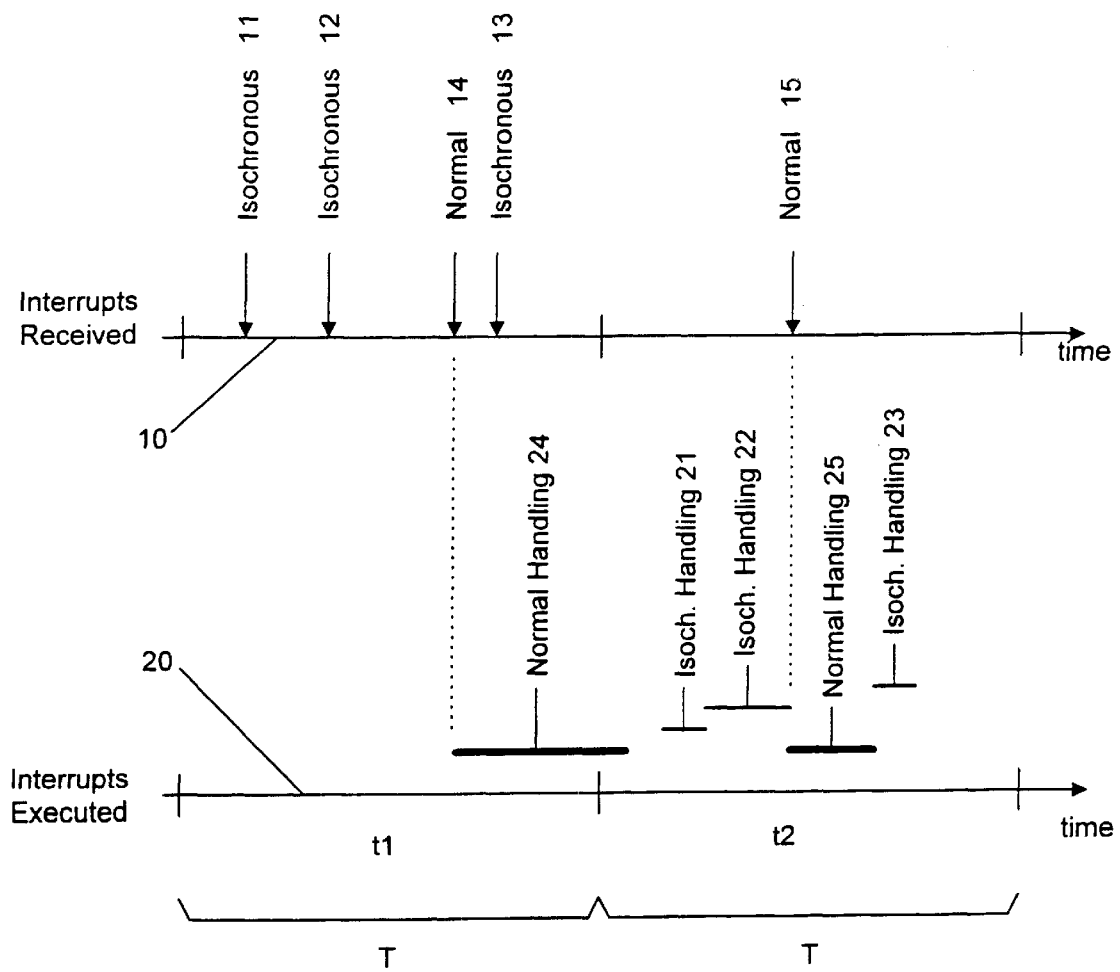
FIG. 1 shows event time lines of an example of an operation of an exemplary isochronous interrupt handling sequence according to the present invention.

FIGS. 1–5 illustrate an exemplary embodiment of an interrupt handling system, according to the present invention. This embodiment uses "isochronous interrupts," which take advantage of the expected resource needs for the data transmissions of certain devices (and the ability to slightly delay data reception from these devices) in order to conveniently schedule the execution of interrupt handling routines for these devices. By so doing, the computer system may prevent contention with other devices, and thus efficiently manage data reception.

A device that supports isochronous interrupts may transmit an isochronous interrupt request to the computer system, indicating that data is ready for transmission by the device to the computer system. However, under the isochronous interrupt handling procedure, this interrupt request is received by the computer system, but not immediately executed. Instead, the interrupt request is stored until it is executed at a later time (during a predefined time period, to be explained further below) by running an interrupt handling routine associated with that interrupt. Furthermore, the computer system may execute the isochronous interrupt request at any time during the time period (e.g., rather than at the beginning of the time period), subject to the constraint that the interrupt is executed at some time during the time period. The device provides a facility for keeping the data to be transmitted valid during the delay between the transmission of the interrupt request and the actual transmission of the data (e.g., by using a buffer). By giving the computer system the flexibility of "shifting" the time when the interrupt is to be executed, the computer system can efficiently service other interrupts and system operations without the risk of losing the data being provided by the isochronous device.

Isochronous interrupts may be configured for a device connected to the system by setting an "isochronous transmission rate" for the device. The isochronous transmission rate reflects the maximum number of expected interrupts for the device during a given time period, and is expressed in the form X/T, where X is the maximum number of expected interrupts and T is the duration of the time period being used to service isochronous interrupts. For example, using a service time period of 10 ms, a device that would be expected to have data for transmission once every 5 ms (i.e., would generate an interrupt once every 5 ms.) would have $^{2}/_{10}$ isochronous transmission rate. The isochronous transmission rate may be negotiated by the computer system and the device, for example, based on the worst case bandwidth requirements of the device. For example, a modem capable of operating at 56 Kbps would, under peak operating conditions, receive 2 bytes of data approximately every 3.2 ms. If the isochronous time period is set to be, for example, 10 ms, the isochronous transmission rate for the modem might be set to $^{4}/_{10}$, since at most 4 interrupts would be generated by the modem during the 10 ms time period (where 2 bytes of data is transmitted per interrupt). In this example, the modem may communicate its data bandwidth needs to the computer system, and the computer system may set up an isochronous interrupt handling service for this device.

As mentioned above, isochronous interrupts are serviced according to service time periods (the "T" from the above formula). Depending on the system implementation, all isochronous interrupts may be serviced according to the same time period (a "system-wide isochronous service period"), or each device may have its own time period for servicing its isochronous interrupts ("device-specific isochronous service period"). In the latter case, the service time period for each device may correspond to integer multiples of the same base time unit for a faster implementation architecture (e.g., 10 ms, 20 ms, 30 ms), or may be completely independent of each other. In any case, the length of the time period used should not be overly long as to require inordinate amounts of data buffering for the devices. Thus, the examples given for T above are merely illustrative, as T may be of shorter or longer duration as necessary.

Isochronous interrupts also may be serviced according to a predetermined "latency" time L, reflecting the number of time periods before an isochronous interrupt request is serviced. For example, in the typical case, an isochronous interrupt is serviced in the time period following the time period in which it is received. In such a case, the latency time L=1(one time period delay in service). The latency time may be set to any positive integer value, although large latencies may lead to undesirable delays in data reception. As with the service period T, the latency time L may be set on a system-wide basis, or for each individual device, depending on the implementation.

A first example of the operation of an exemplary isochronous interrupt handling system is illustrated in FIG. 1, which shows event time lines for a hypothetical operation of a computer system that employs isochronous interrupts. The example shown in FIG. 1 uses a system-wide isochronous service period of time T. Two service time periods t1 and t2 are illustrated in FIG. 1. The system-wide latency time L for this example is one period, thus all isochronous interrupts received during time period t1 are expected to be serviced during time period t2.

As shown in FIG. 1, during the time period t1, four interrupts are received by the computer system, reflected by the arrows on the "interrupt received" time line 10: isochronous interrupts 11, 12 and 13, and "normal" interrupt 14 (for example, an asynchronous interrupt). Isochronous interrupts 11, 12 and 13 are not immediately executed by the computer system, but rather are stored for execution during the later time period t2. The devices requesting isochronous interrupts 11, 12 and 13 will use isochronous interrupt processing facilities to maintain the viability of the data to be transmitted during the latency time between the interrupt request and the servicing of the request by the computer system. Normal interrupt 14, however, is serviced immediately by the computer system, as reflected by the execution period bar on the "interrupt executed" time line 20 for the interrupt handler 24 (which is used to service normal interrupt 14). Note that isochronous interrupt 13 occurs during the execution period of interrupt handler 24. If isochronous interrupt 13 were a normal interrupt, the computer system would not be able to service this interrupt until after the completion of the interrupt handler 24 for the normal interrupt 14, and it is possible that the data to be transmitted via interrupt 13 would be lost due to this delay.

During time period t2, the computer system services isochronous interrupts 11, 12 and 13, as reflected by the execution period bars on the "interrupt executed" time line 20 for corresponding interrupt handlers 21, 22 and 23. In this example, the processing of normal interrupt 14 (via interrupt handler 24) has extended into time period t2, and thus the computer system does not begin processing the isochronous interrupts until later in the time period. The computer system has the option of scheduling the execution of the isochronous interrupt requests at any time during time period t2, as long as the computer system services all of the pending isochronous interrupts during that time period. As shown in FIG. 1, the computer system has decided to service the isochronous interrupts some time after the end of the interrupt handler 24. This time delay may reflect the computer system performing other important tasks (memory refresh, etc.) that are more time-critical. Isochronous interrupt 11 is processed first, as illustrated by the execution period bar for interrupt handler 21, followed by isochronous interrupt 12, as illustrated by the execution period bar for interrupt handler 22.

The flexibility of isochronous interrupts is further illustrated by the processing of isochronous interrupt 13. As shown in FIG. 1, a normal interrupt 15 is received by the computer system during the execution period for interrupt handler 22. At the completion of this interrupt handler 22, the computer system services the normal interrupt 15 using interrupt handler 25, rather than servicing the isochronous interrupt 13. The computer system has this flexibility, since it is known that only one more isochronous interrupt must be processed, and there remains a significant amount of time in period t2 in order to perform the necessary processing of corresponding interrupt handler 23. The computer system thus delays the processing of isochronous interrupt 13, and instead executes the interrupt handler 25 for normal interrupt 15. At the completion of interrupt handler 25, the computer system then executes the interrupt handler 23 for isochronous interrupt 13.

FIG. 1 illustrates only one period of what would be a number of service periods for servicing the isochronous interrupts received by the computer system. For example, during period t2, the computer system would be receiving isochronous interrupts to be processed during the following time period. Likewise, during period t1, the computer system would be processing isochronous interrupts received during an earlier time period. Furthermore, the event time lines of FIG. 1 are not necessarily to scale, as the timing of interrupt handling routines has been exaggerated to more clearly illustrate the operation of isochronous interrupt handling procedure.

Figure 2:
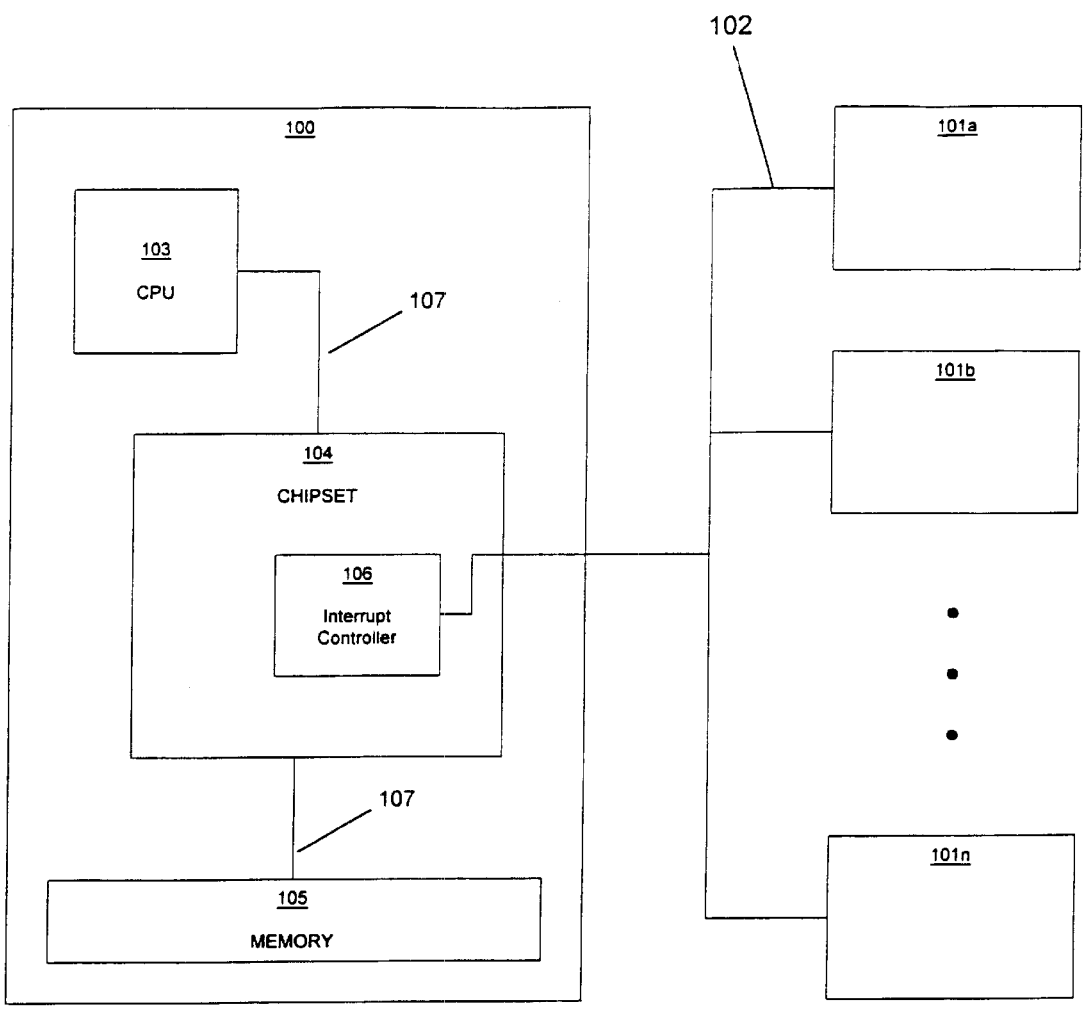
FIG. 2 shows a block diagram of an exemplary computer system incorporating an exemplary isochronous interrupt handling system, according to the present invention.

FIG. 2 shows a block diagram of an exemplary processing system 100 and devices 101 having isochronous handling features. Devices 101 (individually labelled 101a–101n) are connected to the processing system 100 via an I/O bus 102 that allows the transmission of control, address and data signals between the processing system 100 and each device 101. Processing system 100 comprises a CPU 103 (e.g. a microprocessor), a chipset 104 and memory 105, each interconnected by a system bus 107. Processing system 100 may include other elements as well, although not illustrated in FIG. 2 for clarity. Chipset 104 may comprise one or more integrated circuit devices to manage the operation of various system components (e.g., memory 105), and to control the connections between the CPU 103 and system components (e.g., memory 105, devices 101). One specific arrangement might use a Pentium™-series microprocessor sold by Intel Corporation, Santa Clara, Calif., a 440BX chipset, also sold by Intel Corporation, and DRAM memory devices, interconnected via a PCI-type system bus, as is well known. Other specific arrangements are possible.

Figure 3:
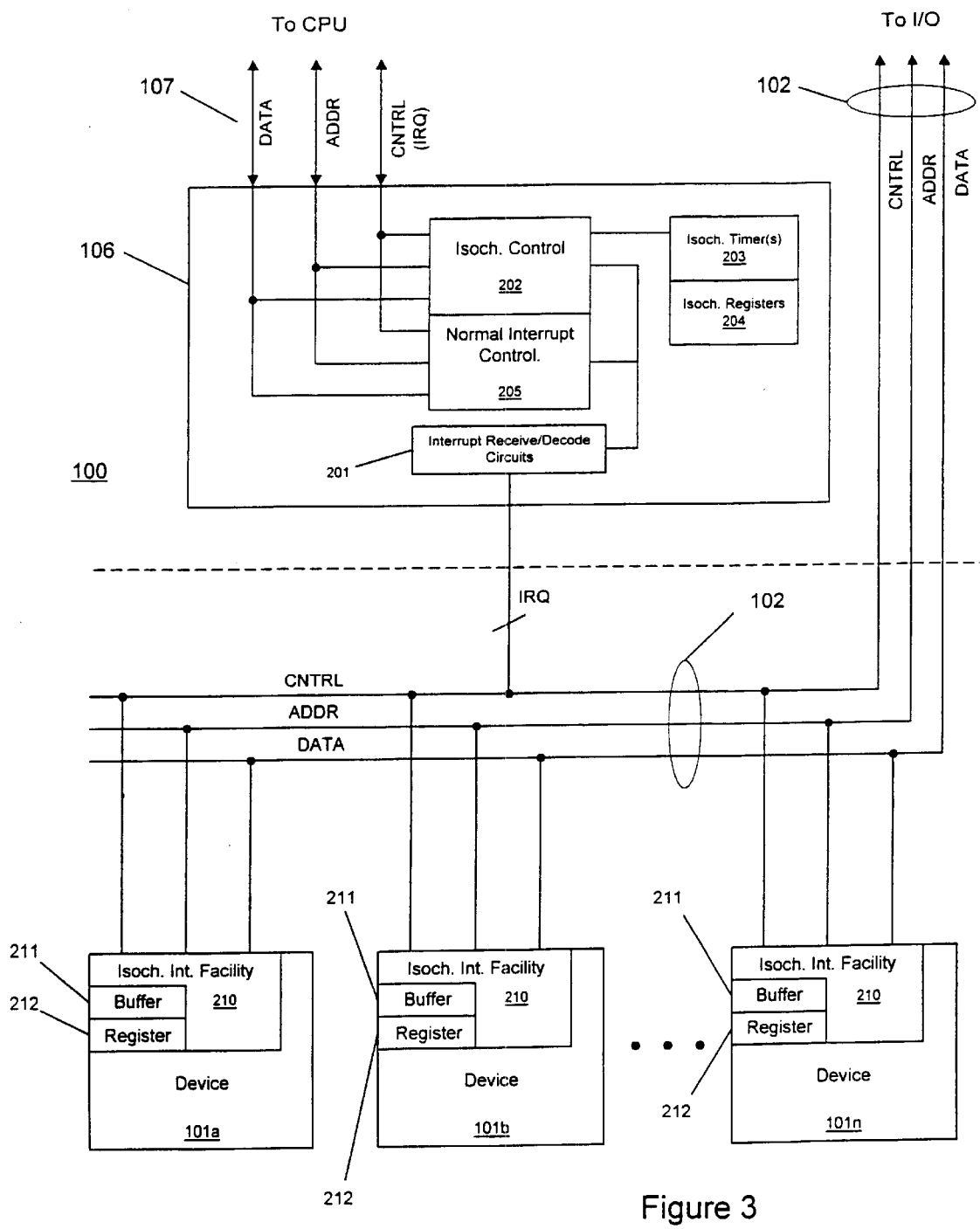
FIG. 3 shows a detailed block diagram of the exemplary isochronous interrupt handling system of FIG. 2, according to the present invention.

As shown in FIG. 2, the chipset 104 includes an interrupt controller 106 (which may be a separate integrated circuit or a part of a larger device) to control and manage the servicing of interrupt requests made by devices 101 to the CPU 103. Interrupt controller 106 is coupled to the I/O Bus 102 to receive interrupt requests from the devices 101 coupled to the I/O Bus 102. FIG. 3 shows a more detailed block diagram of the interconnections of devices 101 with the interrupt controller 106. Additional interconnections may exist, but are omitted from FIG. 3 for clarity. I/O Bus 102 comprises, for example, data, address and control paths in order to allow data to be passed between devices 101 and the processing system 100 (for example, via an I/O controller not shown). The control path may include a number of interrupt request lines ("IRQ lines") used to transmit interrupt request signals to the interrupt controller 106. These lines may be dedicated IRQ lines (e.g., one line per device), shared or encoded lines, or another type of interrupt signaling method, as is well known.

FIG. 3 further shows an implementation of the exemplary isochronous interrupt handling system in both the interrupt controller 106 and each device 101. Interrupt controller 106 includes an interrupt receiver/decoder 201, which is coupled to the I/O bus 102 via an input port in order to receive interrupt requests via the I/O bus 102. Interrupt controller 106 further includes an isochronous controller 202 to control the processing of isochronous interrupt requests, as well as a number of isochronous timers 203 and isochronous registers 204. Interrupt controller 106 further includes normal interrupt controller 205 for processing normal interrupts. The normal interrupt processor 205 and isochronous controller 202 are coupled to the system bus 107 via an output port to provide, for example, a microprocessor interrupt signal and interrupt number to the CPU 103, and to allow the CPU 103 to access, for example, the isochronous registers 204 in interrupt controller 106.

Each device 101 includes an isochronous interrupt facility 210, used to generate isochronous interrupt requests. Isochronous interrupt facility 210 may include a buffer 211 used to store data bytes during the latency period of the isochronous handling process, and may further include a register 212 to store control information related to I/O isochronous interrupt process (e.g., isochronous transmission rate, latency time). Isochronous interrupt facility 210 will include functionality to provide interrupt requests over the I/O Bus 102, according to the particular interrupt signaling mechanism used (i.e., dedicated lines, shared lines, vectors, etc.). Isochronous interrupt facility 210 will also include functionality to "negotiate" the isochronous transmission rate with the processing system 100 (e.g., via a plug-and-play interface).

Figure 4:
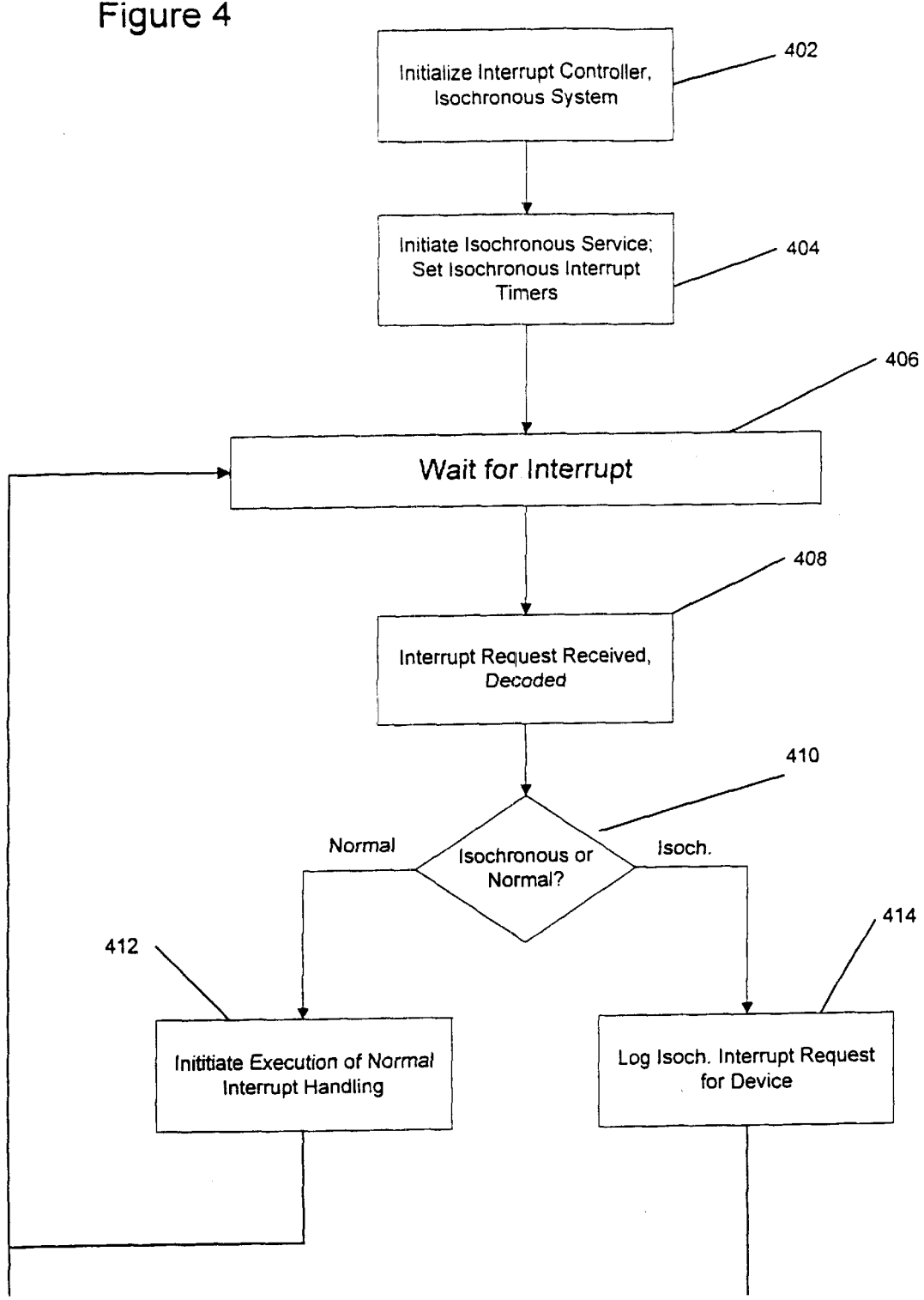
FIG. 4 shows a first flow chart of an exemplary operation of the isochronous interrupt handling system of FIG. 2, according to the present invention.
Figure 5:
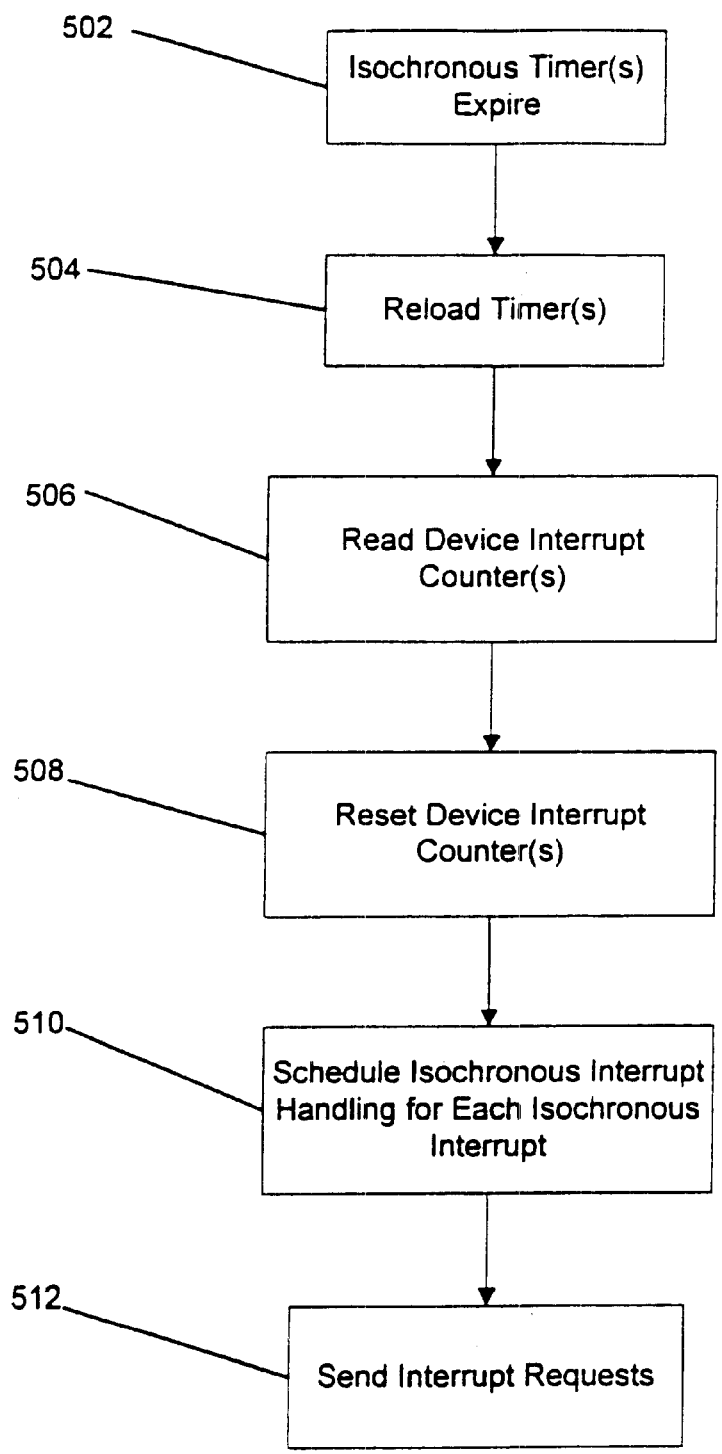
FIG. 5 shows a second flow chart of an exemplary operation of the isochronous interrupt handling system of FIG. 2, according to the present invention.

A second example of the operation of the exemplary isochronous interrupt handling system, in conjunction with exemplary interrupt controller 106 and devices 101, is illustrated by the flow charts of FIGS. 4 and 5. In step 402, the CPU 103 initializes the interrupt controller 106. Initialization may include the configuration of both the normal interrupt handling system and the isochronous interrupt handling system. The normal interrupt handling system may be configured by specifying the availability and/or priority of each possible interrupt. The isochronous interrupt handling system may be configured, for example, by specifying the type of service used (system-wide or device-specific), and the service period T and latency time L, as well as which interrupts should be treated isochronously. Each of these parameters may be stored in isochronous registers 204, or in another location accessible to isochronous controller 202. Initialization may further include determining what devices are coupled to the computer system 100 (e.g., via a "plug-and-play" feature) and, for each isochronous device, determining the expected number of isochronous interrupts for each device, for example, via communications with each device's isochronous interrupt facility 210. These values may also be stored in isochronous registers 204, or another accessible memory location for reference by the isochronous controller 202.

In step 404, the isochronous controller 202 initiates the isochronous interrupt service process, by loading the isochronous timers 203 with the service time T. In the present example, only one timer 203 is used (system-wide service period), however, multiple timers 203 could be used to implement multiple service times for various devices, as previously mentioned. Timer 203 begins counting clock cycles until the service time has expired, and then restarts for the next service period. The interrupt controller 106 is then available to receive an interrupt request (step 406). In step 408, one of the devices 101 transmits an isochronous interrupt request according to the interrupt request mechanism via I/O bus 102. Interrupt receiver/decoder 201 receives the interrupt request, determines the device asserting the interrupt request, and provides the information to isochronous controller 202 and normal interrupt controller 205. Isochronous controller 202 and normal interrupt controller 205 then determine whether the interrupt is an isochronous interrupt or a normal interrupt (step 410). This determination may be performed in various ways, depending on the interrupting mechanisms and the system format. Identification information may be stored at the interrupt controller 106 (for example, during initialization step 402), in order to perform this determination. For example, where each device asserts an interrupt request on a particular IRQ line of I/O bus 102, a list of IRQ lines that are to be serviced in isochronous mode may be stored at the interrupt controller 106 in order to perform the decoding. In addition, where the interrupt is generated by transmitting a particular interrupt code, the interrupting device may send a special code to indicate that the interrupt is to be handled isochronously. Other well known interrupt signaling and decoding schemes may also be employed.

If it is determined that the interrupt is normal, a normal interrupt handling procedure is executed (step 412). The normal interrupt handling procedure may include: signalling the CPU 103 that an interrupt is pending and the interrupt number, interrupting the processing of current program execution, and executing an interrupt handling routine associated with the interrupt number. Once the interrupt system has requested that the CPU perform interrupt handling, the interrupt system is again available to receive more interrupt requests (step 406).

If it is determined that the interrupt is isochronous, the interrupt request is logged according to the device requesting the interrupt (step 414). For example, for each device supporting isochronous interrupts, a register in isochronous registers 204 may be used to count the occurrence of interrupt requests during each service period. Once the interrupt request has been logged, the interrupt system resumes waiting for more interrupt requests (step 406).

FIG. 5 illustrates the process by which logged isochronous interrupts are serviced. In step 502, one or more of the isochronous timers 203 expires (reaches "0"), causing the isochronous controller 202 to begin a service routine to service the isochronous interrupts previously received. In step 504, the isochronous timers 203 are reset with the service time T, to perform counting for the start of the next service period. In step 506, the isochronous controller 202 reads the interrupt receive counters for each device supporting isochronous interrupts that is being serviced using the timer that has expired. In this example, a system-wide service time is being used, and therefore the interrupt receive counters for all isochronous devices are read for received interrupts. These counters are then reset for counting isochronous interrupt requests received during the next service period (step 508). Where the latency time L is greater than one, an array of counters may be used for each device in order to record the interrupts received during each service period. In such a case, the "oldest" counter is read by the isochronous controller 202 and reset, and this "oldest" counter becomes the counter to be used to record isochronous interrupts for the new service period.

In step 510, interrupt controller 202 determines a schedule for executing the interrupt handling routines for all pending isochronous interrupts. This scheduling can be performed using many known methods, as will provide the flexibility in interrupt processing desired under the isochronous scheme. For example, the schedule may be determined initially based on information known to the isochronous controller 202, such as: the number of interrupts expected, the length of the interrupt handling routine for the interrupt, and the actual number of interrupts to be processed during the service period.

Once the schedule is completed, the isochronous controller 202 signals the appropriate interrupts to the CPU 103 at times set under the schedule during the service time period (step 512). The isochronous controller 202 may receive directives from the CPU 103 and/or the normal interrupt controller 205 (e.g., via handshaking or other signaling) during the service period to alter the initial service schedule. For example, if a normal interrupt is received that must be serviced, the CPU 103 or the normal interrupt controller 205 may notify the isochronous controller 202, in order to have the isochronous controller 202 "shift" the processing of any scheduled isochronous interrupt handling until a time when the CPU 103 may service the interrupt. Note that steps 510 and 512 may be combined or eliminated in some degree, depending on the degree of flexibility desired in servicing isochronous interrupts.

In the preceding specification, the invention has been described with reference to specific exemplary embodiments thereof. It will, however, be evident that various modifications and changes may be made thereunto without departing from the broader spirit and scope of the invention as set forth in the claims that follow. For example, some or all of the circuits described herein may be implemented as programmable logic or software, and some of the specific functional elements may be physically located in various places within the system (e.g., an interrupt controller may be located within a microprocessor). In addition, the various "coupling" and "connection" described herein indicates electrical and/or logical coupling and connection, and is intended to include connections made via transceivers, buffers, "glue logic," and other well known signal transmission accessories. The specification and drawings are accordingly to be regarded in an illustrative rather than restrictive sense.

What is claimed is:

1. A method for processing interrupts, comprising:
   receiving a first interrupt during a first time period;
   delaying the execution of a first interrupt handling routine corresponding to the first interrupt until a second time period; and
   executing the first interrupt handling routine before the end of the second time period.

2. The method of claim 1, further comprising:
   identifying the first interrupt as an isochronous interrupt.

3. The method of claim 1, wherein the first time period and the second time period are of the same duration.

4. The method of claim 1, wherein the first time period and the second time period are consecutive in time.

5. The method of claim 1, wherein the first time period and second time period are separated in time by at least one additional time period.

6. The method of claim 1, further comprising:
   receiving a second interrupt during the second time period; and
   executing a second interrupt handling routine corresponding to the second interrupt.

7. The method of claim 6, further comprising:
   scheduling the execution of the second interrupt handling routine after receipt of the second interrupt subject to a constraint that the first interrupt handling routine is executed before the end of the second time period.

8. The method of claim 6, further comprising:
   delaying the execution of the first interrupt handling routine until after the execution of the second interrupt handling routine is completed.

9. The method of claim 6, further comprising:
   identifying the second interrupt as an asynchronous interrupt.

10. The method of claim 1, further comprising:
    determining a maximum number of interrupts to be received during the first time period;
    receiving a number of interrupts up to the maximum number of interrupts during the first time period, wherein the first interrupt is one of the number of interrupts; and executing a number of interrupt handling routines corresponding to the number of interrupts during the second time period wherein the first interrupt handling routine is one of the number of interrupt handling routines.

11. The method of claim 10, wherein the execution of each of the number of interrupt handling routines is according to a schedule.

12. The method of claim 11, further comprising:

receiving a second interrupt during the second time period, the second interrupt not being one of the number of interrupts; and executing an interrupt handling routine corresponding to the second interrupt, at least a portion of the execution of the interrupt handling routine corresponding to the second interrupt occurring during the second time period.

13. The method of claim 12, further comprising:

altering the schedule for the execution of at least one of the number of interrupt handling routines in order to execute the interrupt handling routine corresponding to the second interrupt.

14. The method of claim 12, further comprising:

scheduling the execution of the interrupt handling routine corresponding to the second interrupt after receipt of the second interrupt subject to a constraint that the first interrupt handling routine is executed before the end of the second time period.

15. A method for processing interrupts, comprising:

receiving a number of interrupt requests during a first time period of duration T, each of the number of interrupt requests originating at a device;

determining, for each of the number of interrupt requests, whether the interrupt requests that is isochronous, recording the receipt of the interrupt request during the first time period;

scheduling the generation of at least one microprocessor interrupt signal during a second time period of duration T corresponding to a respective one of the number of interrupt requests that is isochronous;

generating the at least one microprocessor interrupt signal during the second time period;

receiving the at least one microprocessor interrupt signal in a microprocessor; and executing a respective interrupt handling routine corresponding to the at least one microprocessor interrupt signal before the end of the second time period.

16. An interrupt handling system, comprising:

an input port;

an output port; and an interrupt controller coupled to the input port and the output port, the interrupt controller including an isochronous interrupt controller to process at least one isochronous interrupt request received via the input port during a first time period and generate an interrupt signal at the output port during a second time period to execute the interrupt signal before the end of the second time period.

17. The interrupt handling system of claim 16, wherein the interrupt controller further includes at least one timer coupled to the isochronous interrupt controller to provide an indication of an end of the first time period.

18. The interrupt handling system of claim 16, wherein the interrupt controller further includes at least one register coupled to the isochronous interrupt controller to provide at least one of storage of control information and counting of received isochronous interrupt requests.

19. The interrupt handling system of claim 16, wherein the interrupt controller further includes a decoder to determine whether an interrupt request received via the input port is an isochronous interrupt request.

20. A computer system, comprising:

a microprocessor having an interrupt processing facility;

an interrupt controller coupled to the microprocessor to provide the microprocessor with a microprocessor interrupt signal, the interrupt controller including an isochronous interrupt controller to receive an interrupt request during a first time period, and to schedule execution of an interrupt handling routine corresponding to the interrupt request by the microprocessor before the end of a second time period.

21. The system of claim 20, wherein the interrupt controller further includes a decoder to determine whether the interrupt request is an isochronous interrupt request.

22. The system of claim 20, wherein the isochronous interrupt controller schedules generation of the microprocessor interrupt signal to cause the microprocessor to execute the interrupt handling routine corresponding to the interrupt request.

23. The system of claim 20, further comprising:

a device coupled to the interrupt controller to generate the interrupt request.

24. The system of claim 23, wherein the device includes an isochronous interrupt facility to generate the interrupt request.

25. The system of claim 24, wherein the isochronous interrupt facility includes a register to store control information.

26. The system of claim 24, wherein the isochronous interrupt facility includes a buffer to maintain the validity of data during at least one of a number of isochronous service periods.

27. The system of claim 26, wherein the isochronous interrupt controller receives the interrupt request from the device during a first isochronous service period of the number of isochronous service periods, and wherein the isochronous interrupt controller schedules execution of the interrupt handling routine corresponding to the interrupt request during a second isochronous service period of the number of isochronous service periods.

28. The system of claim 20, wherein the microprocessor interrupt signal includes an interrupt number.

29. The system of claim 20, wherein the interrupt controller includes at least one isochronous timer and at least one isochronous register.

30. The system of claim 20, further comprising:

a number of devices coupled to the interrupt controller;

wherein the interrupt controller maintains identifying information indicating which one of the number of devices generated the interrupt request.

31. The system of claim 30, wherein the identifying information includes an indication that the interrupt request is an isochronous interrupt request.

\* \* \* \* \*